3,187,025
PROCESS FOR PREPARING COMPOUND S

Percy L. Julian, Oak Park, Arthur Magnani, Wilmette, and Joe M. Hill, Chicago, Ill., and Thomas C. Aschner, King of Prussia, Pa., assignors, by mesne assignments, to Smith Kline & French Laboratories, Philadelphia, Pa., a corporation of Pennsylvania
No Drawing. Filed June 11, 1963, Ser. No. 286,959
18 Claims. (Cl. 260—397.47)

This invention relates to useful processes for preparing Compound S and other steroid intermediates.

It is well-known to the art that Reichstein's Compound S (4-pregnen-17α,21-diol-3,20-dione) is a very important steroid intermediate used to prepare cortisone, hydrocortisone, prednisone, prednisolone and others. Consequently, any improved commercial process is greatly desired and of benefit to the public.

The process of this invention relates to a three-step commercial method for the preparation of Compound S which results in almost a 50% decrease in the cost of the final product. The process is described in block diagram hereafter:

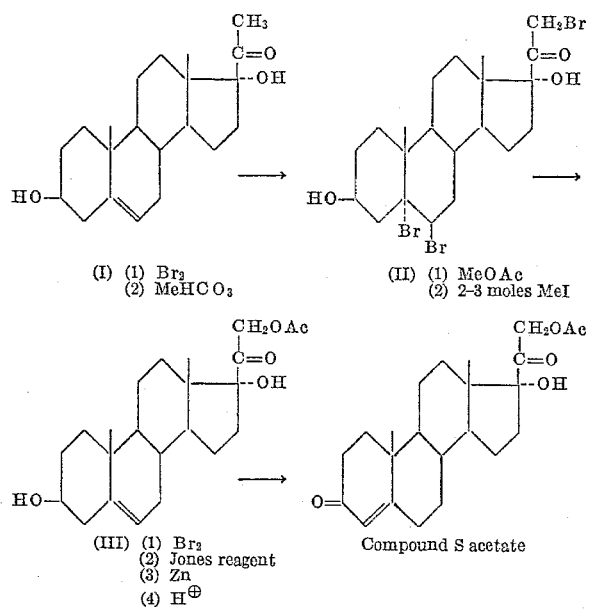

The term Me as used above represents an alkali metal cation.

In the first step of the claimed reaction, Δ⁵-pregnen-3β,17α-diol-20-one is tribrominated to form 5,6,21-tribromo-3β,17α-diol-20-one. In the practice the reaction is carried out in the cold with about one mole of bromine in methylene chloride-pyridine. Then a second mold of bromine is added along with methanol and a hydrogen halide, preferably hydrogen chloride gas, at about room temperature.

The product formed is a tribromo hydrohalide complex which is soluble in the reaction medium. We have found it advantageous at this point to treat the reaction mixture with an agent which removes the hydro halide from the molecular complex to give the free tribromide. Among other things, agents such as weak bases, for example alkali metal carbonates, lower carboxylates or preferably bicarbonates may be used. Preferably sodium or potassium bicarbonate is used. Employment of a strong base is limited to treatment for a very short period of time in order to avoid D-homoannulation of the E ring. The above neutralization procedure insures against hydrohalide complexes of the tribromide being carried over to the next step of the overall process with harmful results.

The solvent for the above reaction is preferably methylene chloride-methanol or chloroform-methanol, however, other solvent or solvent combinations may be used such as dioxane, ethylene dichloride, etc. The reaction above is also most conveniently carried out at room temperature.

Unexpectedly, we have also discovered that the trans-5,6-dibromide, predominantly 5α,6β-trans, separates from the reaction mixture readily after such neutralization as described above leaving the cis-5,6-dibromide in solution. This fact is of the greatest importance since the cis compound can be converted into the Δ⁵,⁶ starting material using appropriate dehalogenating reagents such as zinc dust and acetic acid, or chromous chloride, and reused in the bromination, thereby very materially increasing the overall yield of compounds. Also, we have found that while the trans-5,6-dibromide enters the next step of the reaction sequence, namely debromination, smoothly, the cis-5,6-dibromide largely decomposes under the debromination conditions thereby giving rise to large quantities of hydrogen bromide which results not only in loss of starting material but substantial formation of undesirable by-products which decrease the yield substantially. The importance of this discovery is underscored in that we have found that the yield of the debromination step using the tribromide mixture is not increased, but is in fact somewhat decreased, over the use of the separated trans-5,6-dibromide as starting material.

The second step of the reaction consists of reacting 5α,6β,21-tribromopregnan-3β,17α-diol-3-one with an alkali metal iodide, usually sodium or potassium iodide in a substantially anhydrous organic solvent which is unreactive with the ingredients of the reaction and in which they are substantially soluble such as acetone or methyl ethyl ketone. The iodide is used in from about 2 to 3 mole equivalents rather than a large excess of the iodide. We have surprisingly found that the presence of an alkali metal lower carboxylate, such as sodium or potassium acetate, insures that no minute traces of acid are present to vitiate the potassium iodide reaction and produce strongly reducing hydrogen iodide. The alkali carboxylate does not interfere, however, with smooth dehalogenation at the 5,6-position. The alkali admixtures also remove the iodine as it is formed during the reaction.

After an initial reaction time or about one to three hours in the presence of a minor amount of alkali metal acetate usually at about room temperature the remaining salt is added and the reaction continued to completion by heating preferably under reflux to insert the 21-acetoxy group. If desired small amounts of acetic acid may be added to the reaction mixture. It will be apparent that an alkali metal acetate is preferred over other basic iodine destroying agents since the 21-acetoxylation can then be carried out directly.

The prior art processes of debromination involved the treatment of 5,6-dibromides with alkali metal iodides usually in large excess at least until the separation of iodine during the reaction is complete. This exposes sensitive ketonic compounds to a reaction mixture saturated with iodine which exposure leads to random iodination of the sensitive ketonic positions giving undesirable by-products. The process as described above eliminates this problem by reacting the iodine immediately with an "iodine binding" agent, for example an alkali metal carboxylate, as it is formed. Also using a minimal amount of iodide to good yield is very advantageous from a cost viewpoint.

The presence of the alkaline admixture during the reaction also enables the omission of the additional treatment of the reaction mixture with sodium thiosulfate to remove free iodine as in the prior art process. Besides the commercially costly dilutions involved in the prior art processes necessary to isolate the desired product, the procedure of this invention avoids the formation of undesirable sulfur products arising from the use of thiosulfate.

The overall yield of the process to this point is about 108% by weight of the 17α-hydroxypregnenolone converted (via tribromide); 114% is theoretical.

The last step of this reaction sequence is the conversion of 5-pregnen-3β,17α,21-triol-20-one 21-acetate into Compound S by oxidation at position 3. No completely satisfactory commercial method of chemical oxidation existed in the prior art for formation of this important compound. All previous chemical oxidation methods resulted in substantial cleavage at the 17,20-position to produce 17-keto steroids. We have now found that partial bromination of the pregnentriolone, at the 5,6-position, by methods known to the art such as 1 mole of bromine in methylene chloride, preferably in the presence of pyridine, enables the use of a modification of the Jones reagent (i.e., a modified Kiliani reaction) for subsequent oxidation at position 3 without cleavage to 17-keto steroids.

The Jones reagent and its reaction conditions are well known (See Bwoden et al., J. Chem. Soc., 1946, 39, or "Steroids," Fieser, 1959, pages 52 and 224). The reagent consists of chromic acid (or anhydride) in aqueous sulfuric acid. The reaction solvent is usually ketonic such as acetone or methyl ethyl ketone. We have found that a mixed solvent system of acetone or methyl ethyl ketone and a chlorinated solvent such as methylene chloride, chloroform, ethylene dichloride, etc. is particularly advantageous for this particular oxidation. Other solvents may be used to somewhat less advantage such as dimethylformamide, pyridine, etc. The preferred and most advantageous solvent system is acetone-methylene chloride. The oxidation is usually carried out in the cold, i.e., about 0–10° C.

If desired the 5α,6β-dibromopregnan-3β,17α,21-triol-20-one 21-acetate may be separated and used as described hereinbefore in the first step of this overall reaction. This insures no random reactions during subsequent steps.

The resulting 5,6-dibromopregnan 17α,21-diol-3,20-dione 21-acetate is then debrominated under standard conditions such as using zinc in the presence of acetic acid or using chromous chloride. One skilled in the art will realize that some isomerization of the 5,6-double bond to the desired 4,5-conjugated system will occur during debromination. It is well however to complete isomerization or shifting of the double bond by treatment of the debromination product with acid such as hydrochloric acid to give the desired Compound S acetate. The debromination and isomerization steps are carried out under conditions well-known to the art usually at moderate temperatures such as under 50° C. More vigorous temperatures under acid or basic conditions give the parent Compound S.

This overall oxidation procedure gives yields of about 90–95% by weight of starting material.

The advantages of the overall reaction of this invention are that in addition to greater yields it enables larger batch size, shorter worktime, much less cost of chemicals and greater through-put.

The term "alkali metal" is used as usually defined in the art with sodium potassium and calcium cations preferred. "Lower carboxylate" means having a maximum of 6 carbon atoms.

It will be apparent to one skilled in the art that certain modifications in the processes of this invention, particularly the individual steps which in themselves are old to the art, can be made without departing from the nub of the invention as described above such as using the 3-acetyl derivative, alternative solvents or equivalent reagents. The practice of this invention and its advantages will be readily appreciated from the following example.

*Example 1*

A mixture of 66.4 kg. of 17α-hydroxypregnenolone, 498 l. of methylene chloride and 3.32 l. of pyridine is cooled to 8° C. when 33.2 kg. of bromine in 33.2 l. of methylene chloride is added. After stirring briefly the batch is warmed to about 30° C. and with stirring 33.2 l. of methanol is added, followed by a portion of a solution of 34.7 kilos of bromine in 33.2 l. of methylene chloride. Dry hydrogen chloride is bubbled through the mixture until 21-bromination begins. The remainder of the bromine solution is then added rapidly. Methanol (66.4 l.) is added and a mixture of 42.03 kg. of sodium bicarbonate in 498 l. of water is slowly added. The mixture is cooled and stirred at 0° C. for 2 hours. The precipitate is separated, washed and dried to give 90–95 kg. of tribromide.

The mother liquors are collected and allowed to stand to separate the layers. The organic layers are separated diluted with methanol, acetic acid and debrominated with zinc dust. Alternatively the organic layer is debrominated with chromous chloride in the usual maner. The recovered starting material is isolated as known to the art from the reaction mixture.

The tribromide from above (90–95 kg.) is suspended in 380 l. of acetone with 57 kg. of sodium iodide and a portion (9.5 kg.) of the 135 kg. of potassium acetate added. After one hour stirring, 570 l. of acetone is added with the remainder (125 kg.) of the potassium acetate and 9 kg. of acetic acid. The mixture is heated at reflux for 3 hours, concentrated and diluted with 900 l. of water. Separating and drying gives 61–65 kg. of 5-pregnen-3β,17α,21-triol-20-one 21-acetate, which may be optionally crystallized.

Forty kg. of the dried pregnentriolone acetate in 160 l. of methylene chloride is cooled to 5–8° C. 1.6 l. of pyridine is added. A solution of 18 kg. of bromine in 20 l. of methylene chloride is added. Acetone (480 l.) is added and the solution chilled back to 0–5° C. A solution of 15.77 kg. of chromic acid, 16 l. of water and 13.545 l. of sulfuric acid (Jones reagent) is added as rapidly as possible, holding temperature below 23° C. Time of addition should be about 10–15 minutes. Stirring is continued for an additional 30 minutes after all Jones reagent has been added.

Two hundred eighty l. of methylene chloride is added then 700 l. of water, the mixture is stirred and warmed up to 30° C. and let stand to separate the methylene chloride layer. This layer is washed with water, 120 l. of methanol and 20 l. of acetic acid added, and debrominated with 13 kg. of zinc dust in the usual manner. After decantation of solvent from zinc, temperature is adjusted to 30° C., 16 l. of concentrated hydrochloric acid added, and solution let stand with stirring for 30 minutes. Water (700 l.) is added, the methylene chloride layer is separated, washed with 10% caustic solution, then with water to neutrality. The methylene chloride solution is evaporated to a very thick slurry, 280 l. of acetone is added and concentration to a volume of about 120 l. is effected. The mass is chilled to 0° C. and stirred at this temperature for 2 hours. The mass is filtered, giving a yield of Compound S acetate of 82–88% by weight of 21-acetoxy-17α-hydroxypregnenolone used, M.P. 228–236° C.

What is claimed is:

1. The method of preparing 4-pregnen-17α,21-diol-3,20-dione 21-acetate (Compound S acetate) comprising reacting 5-pregnen-3β,17α-diol-20-one with about 2 moles of bromine in an inert organic solvent in which the reactants are soluble to form a solution of 5,6,21-tribromopregnan-3β,17α-diol-20-ones, reacting said solution with an alkali metal bicarbonate to separate 5α,6β,21-tribromopregnan-3β,17α-diol-20-one from the reaction solution, treating said separated tribromopregnandiolone in the presence of an alkali metal acetate with from about 2–3 moles of an alkali metal iodide to form the $\Delta^{5,6}$-21-halopregnen-3$\beta$,17$\alpha$-diol-20-one, heating said reaction mixture to complete 21-acetoxylation and to form 5-pregnen-3$\beta$,17$\alpha$,21-triol-20-one 21-acetate, reacting said pregnentriolone acetate with about one mole of bromine to give the 5,6-dibromide, oxidation of said dibromide with Jones reagent at temperatures below room temperature to give 5,6-dibromopregnan-17$\alpha$,21-diol-3,20-dione 21-acetate, zinc debromination of said dibromopregnandioldione to 5-pregnen-17$\alpha$,21-diol-3,20-dione 21-acetate, and isomerization under acid conditions to complete the formation of 4-pregnen-17$\alpha$,21-diol-3,20-dione 21-acetate.

2. The method of claim 1 in which the oxidation with Jones reagent is carried out in a mixed solvent system selected from the group consisting of acetone-methylene chloride and methyl ethyl ketone-methylene chloride.

3. The method of claim 1 in which the reaction medium from which 5$\alpha$,6$\beta$,21-tribromopregnan-3$\beta$,17$\alpha$-diol-20-one separates is largely methanol-methylene chloride.

4. The method of claim 1 in which the mother liquors containing 5$\alpha$,6$\alpha$,21-tribromopregnan-3$\beta$,17$\alpha$-diol-20-one are recycled by reacting said mother liquors with zinc and acetic acid to debrominate and thereby regenerate 5-pregnen-3$\beta$,17$\alpha$-diol-20-one starting material.

5. The method of claim 1 in which the mother liquors containing 5$\alpha$,6$\alpha$,21-tribromopregnan-3$\beta$,17$\alpha$-diol-20-one are recyclized by reacting said another liquors with chromous chloride to debrominate and thereby regenerate 5-pregnen-3$\beta$,17$\alpha$-diol-20-one starting material.

6. The method of preparing 4-pregnen-17$\alpha$,21-diol-3,20-dione 21-acetate comprising reacting 5-pregnen-3$\beta$,17$\alpha$,21-triol-20-one 21-acetate with about one mole of bromine to form 5,6-dibromopregnan-3$\beta$,17$\alpha$,21-triol-20-one 21-acetate, oxidation of said dibromopregnantrioline with Jones reagent at temperatures below room temperature to form 5,6-dibromopregnan-17$\alpha$,21-diol-3,20-dione 21-acetate, debromination of said dibromopregnandioldione with zinc to form 5-pregnen-17$\alpha$,21-diol-3,20-dione 21-acetate and isomerization under acidic conditions to complete the formation of 4-pregnen-17$\alpha$,21-diol-3,20-dione 21-acetate.

7. The method of claim 6 in which the oxidation with Jones reagent is carried out in acetone-methylene chloride medium.

8. The method of preparing 5-pregnen-21-bromo-3$\beta$,17$\alpha$-diol-20-one comprising reacting 5$\alpha$,6$\beta$,21-tribromopregnan-3$\beta$,17$\alpha$-diol-20-one with from about 2 molar equivalents of an alkali metal iodide in the presence of an alkali metal caboxylate.

9. The method of claim 8 in which the carboxylate is an acetate.

10. The method of claim 9 in which the reaction medium is acetone and the acetate is a member selected from the group consisting of sodium and potassium acetate.

11. The method of claim 9 in which the reaction mixture is heated directly in the presence of a member selected from the group consisting of sodium and potassium acetate to form 5-pregnen-3$\beta$,17$\alpha$,21-triol-20-one 21-acetate.

12. The method of claim 11 in which the reaction medium is acetone.

13. In the method of preparing 5$\alpha$,6$\beta$,21-tribromopregnan-3$\beta$,17$\alpha$-diol-20-one comprising reacting 5-pregnen-3$\beta$,17$\alpha$-diol-20-one with about 2 moles of bromine in an inert organic solvent in which all the reactants are soluble, the modification which comprises substantially neutralizing the reaction solution with an alkali metal bicarbonate to precipitate the 5$\alpha$,6$\beta$,21-tribromopregnan-3$\beta$,17$\alpha$-diol-20-one directly from said reaction solution.

14. The method of claim 13 in which the mother liquor from the precipitation is debrominated to recover 5-pregnen-3$\beta$,17$\alpha$-diol-20-one which is recycled in the bromination procedure.

15. The method of claim 13 in which the organic solvent is methylene chloride-methanol.

16. The method of claim 15 in which the alkali metal bicarbonate is a member selected from the group consisting of sodium bicarbonate and potassium bicarbonate.

17. The method of claim 13 in which the reaction mixture is cooled to about 0° C. to insure substantially complete separation of the 5$\alpha$,6$\beta$,21-tribromide.

18. The method of preparing 5-pregnen-3$\beta$,17$\alpha$,-triol-20-one 21-acetate comprising reacting 5-pregnen-3$\beta$,17$\alpha$-diol-20-one with about 2 moles of bromine to form a solution of 5,6,21-tribromopregnan-3$\beta$,17$\alpha$-diol-20-one, reacting said solution with an alkali metal bicarbonate to separate 5$\alpha$,5$\beta$,21-tribromopregnan-3$\beta$,17$\alpha$-diol-20-one from the reaction mixture, treating said separated tribromopregnanediolone isomer in the presence of an alkali metal acetate with from about 2–3 moles of an alkali metal iodide to form 21-bromo-$\Delta^{5,6}$-pregnen-3$\beta$,17$\alpha$-diol-20-one and heating said 21-bromopregnendiolone with an excess of an alkali metal acetate.

References Cited by the Examiner
UNITED STATES PATENTS

| | | | |
|---|---|---|---|
| 2,820,030 | 1/58 | Julian et al. | 260—397.47 |
| 2,986,572 | 5/61 | Engel | 260—397.3 |
| 3,081,319 | 3/63 | Hess et al. | 260—397.47 |

LEWIS GOTTS, *Primary Examiner.*